United States Patent
Chen et al.

(10) Patent No.: US 12,432,095 B1
(45) Date of Patent: Sep. 30, 2025

(54) SYSTEMS AND METHODS FOR IMPROVING CHANNEL ESTIMATION FOR 5G-NR PUSCH

(71) Applicant: Meta Platforms, Inc., Menlo Park, CA (US)

(72) Inventors: Weizhong Chen, Georgetown, TX (US); Ahmed Gamal Helmy Mohamed, San Jose, CA (US); Colby Scott Boyer, Austin, TX (US)

(73) Assignee: Meta Platforms, Inc., Menlo Park, CA (US)

( * ) Notice: Subject to any disclaimer, the term of this patent is extended or adjusted under 35 U.S.C. 154(b) by 359 days.

(21) Appl. No.: 18/301,916

(22) Filed: Apr. 17, 2023

Related U.S. Application Data

(60) Provisional application No. 63/331,488, filed on Apr. 15, 2022, provisional application No. 63/331,484, filed on Apr. 15, 2022.

(51) Int. Cl.
*H04L 25/00* (2006.01)
*H04B 7/0413* (2017.01)
*H04B 17/309* (2015.01)
*H04L 5/00* (2006.01)
*H04L 25/02* (2006.01)

(52) U.S. Cl.
CPC ......... *H04L 25/022* (2013.01); *H04B 17/309* (2015.01); *H04L 25/0204* (2013.01); *H04L 25/0224* (2013.01)

(58) Field of Classification Search
None
See application file for complete search history.

(56) References Cited

U.S. PATENT DOCUMENTS

| | | | |
|---|---|---|---|
| 2015/0043474 A1* | 2/2015 | Takeda | H04L 5/0037 370/329 |
| 2018/0026764 A1* | 1/2018 | Namgoong | H04B 7/0413 370/329 |
| 2022/0052880 A1* | 2/2022 | Hewavithana | H04L 25/022 |
| 2022/0070037 A1* | 3/2022 | Nam | H04L 1/0051 |
| 2023/0246679 A1* | 8/2023 | Patchava | H04B 7/0478 375/262 |
| 2023/0308233 A1* | 9/2023 | Guetta | H04L 27/10 |
| 2025/0055637 A1* | 2/2025 | Ferdinand | H04J 13/0025 |

* cited by examiner

*Primary Examiner* — Duc T Duong
(74) *Attorney, Agent, or Firm* — EVERSHEDS SUTHERLAND (US) LLP

(57) ABSTRACT

A disclosed computer-implemented method may include (1) receiving a channel estimation signal comprising a plurality of frequency domain signals, each frequency domain signal corresponding to an antenna in a plurality of antennas, a port in a plurality of ports, and a demodulation reference signal sequence, (2) for each frequency domain signal, (A) converting the frequency domain signal to a time domain signal, and (B) determining a power level of the time domain signal, (3) determining, for each port in the plurality of ports (a) a sum of the power levels of the time domain signals corresponding to the port, each antenna in the plurality of antennas, and the DMRS sequence, and (b) based on the determined sum corresponding to the port, measuring (i) a pre-equalization signal-to-interference-plus noise ratio, and (ii) a power delay profile (PDP). Various other systems and methods are also disclosed.

20 Claims, 8 Drawing Sheets

US 12,432,095 B1

SYSTEMS AND METHODS FOR IMPROVING CHANNEL ESTIMATION FOR 5G-NR PUSCH

CROSS-REFERENCE TO RELATED APPLICATION

This application claims the benefit of U.S. Provisional Patent Application No. 63/331,484, filed Apr. 15, 2022, and U.S. Provisional Patent Application No. 63/331,488, filed Apr. 15, 2022, the disclosure of each of which is incorporated, in its entirety, by this reference.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
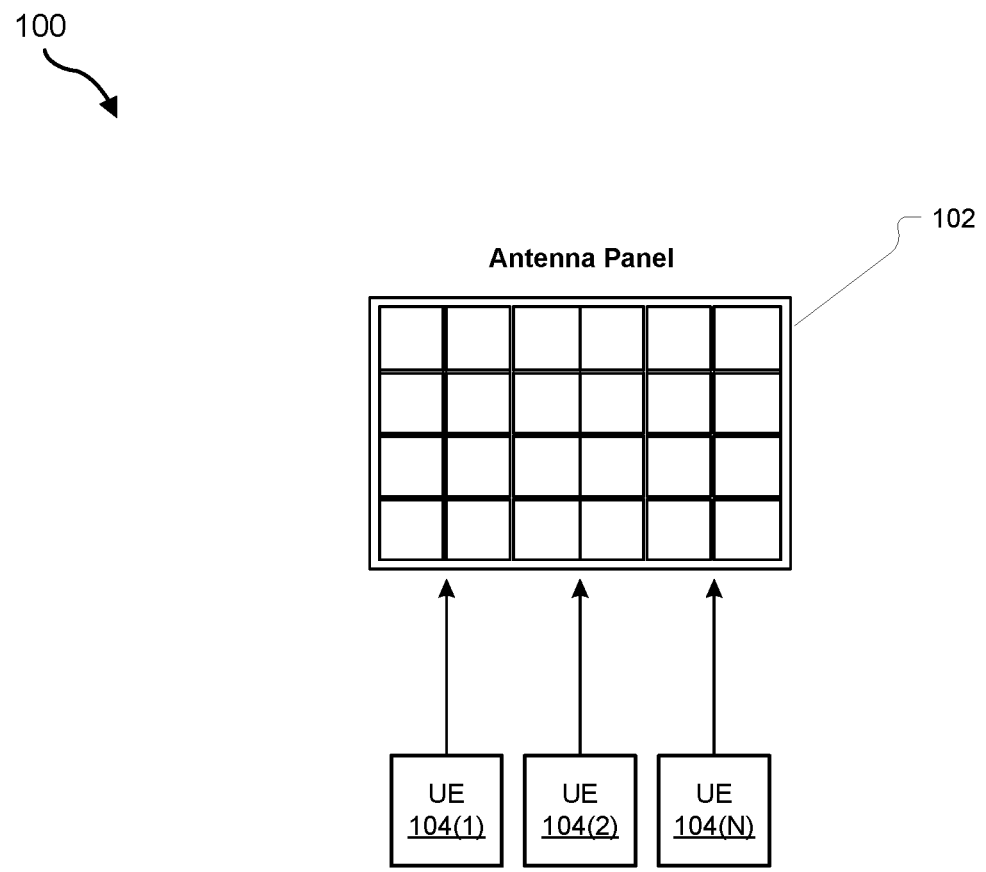
FIG. 1 shows a block diagram of a Multiple-Input, Multiple-Output (MIMO) system that includes an antenna panel that may receive radiations from one or more user equipment devices (UEs).

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

New Radio (NR) is a radio access technology (RAT) developed by the 3rd Generation Partnership Project (3GPP) for the fifth generation (5G) mobile network. In 5G NR, a physical uplink shared channel (PUSCH) is a physical uplink channel that carries user data from a UE device to a base station (BS). A demodulation reference signal (DMRS) is a reference signal associated with PUSCH. DMRS is used for channel estimation as part of coherent demodulation of PUSCH. The DMRS, known to both the BS and the UE, is sent by the UE, and is used by the BS receiver to acquire a propagation channel to recover data from each UE.

The time-frequency structure of DMRS depends on the type of waveform configured for PUSCH, as defined in 3rd Generation Partnership Project; Technical Specification Group Radio Access Network (TS) 38.211 "NR; Physical channels and modulation," §§ 6.4.1.1 and 6.4.1.2. The basic transmission scheme in NR is orthogonal frequency-division multiplexing (OFDM). NR supports a flexible OFDM numerology with subcarrier spacings ranging from 15 kHz up to 240 kHz with a proportional change in cyclic prefix (CP) duration.

In general, an uplink (UL) RB is the smallest resource allocation unit, which is 12 resource elements (RE) in the frequency domain and up to 14 symbols per slot. The frequency separation between REs may be referred to as sub-carrier spacing (SCS). As mentioned above, SCS may be $15 \times 2^\mu$ KHz, such that $\mu=0,1,2,3,4$, resulting in SCS values of 15 KHz, 30 KHz, 60 KHz, 120 KHz, and 240 KHz, respectively. A symbol duration $T^s$ may be related to SCS by $$T_s = \frac{1}{SCS}.$$

Eden symbol nas a cyclic prefix (CP) with a duration related to SCS or u.

DMRS signals are partitioned into code division multiplexing (CDM) groups. Within CDM groups, ports are coded with an orthogonal cover code (OCC). DMRS has different configurations: configuration type 1 includes 2 CDM groups for OCC, with a frequency density of 3 DMRS anchors per RB per port, whereas configuration type 2 includes 3 CDM groups for OCC, with a frequency density of 2 DMRS anchors per RB per port. NR UL supports symbol sharing data and DMRS; configuration type 2 has lower DMRS cost if fewer ports are actually used. REs on unused CDM groups may be used for data, while unused ports within a used CDM may not be used for data. For example, in type 1 single symbol, a maximum of 4 ports are supported. If only port 2/3 is used, the DMRS position for port 0/1 can be used for data. Furthermore, discrete Fourier transform (DFT) spread coded OFDM (DFT-s-OFDM) (e.g., for data) is only defined for DMRS configuration type 1.

In general, massive MIMO systems use one or more antenna panels to receive radiations from multiple UEs, each sending a signal over the same radio resources. Data from a UE can be sent with one or more antenna ports. Each UE is allocated one or more unique antenna ports by a BS. FIG. 1 shows a block diagram of a MIMO system 100 that includes an antenna panel 102 that may receive radiations from one or more UE 104 (e.g., UE 104(1), UE 104(2), UE 104(N)). Note that although FIG. 1 shows three UEs, this is provided by way of example only and a MIMO system 100 may include any suitable number of UE devices.

Figure 2:
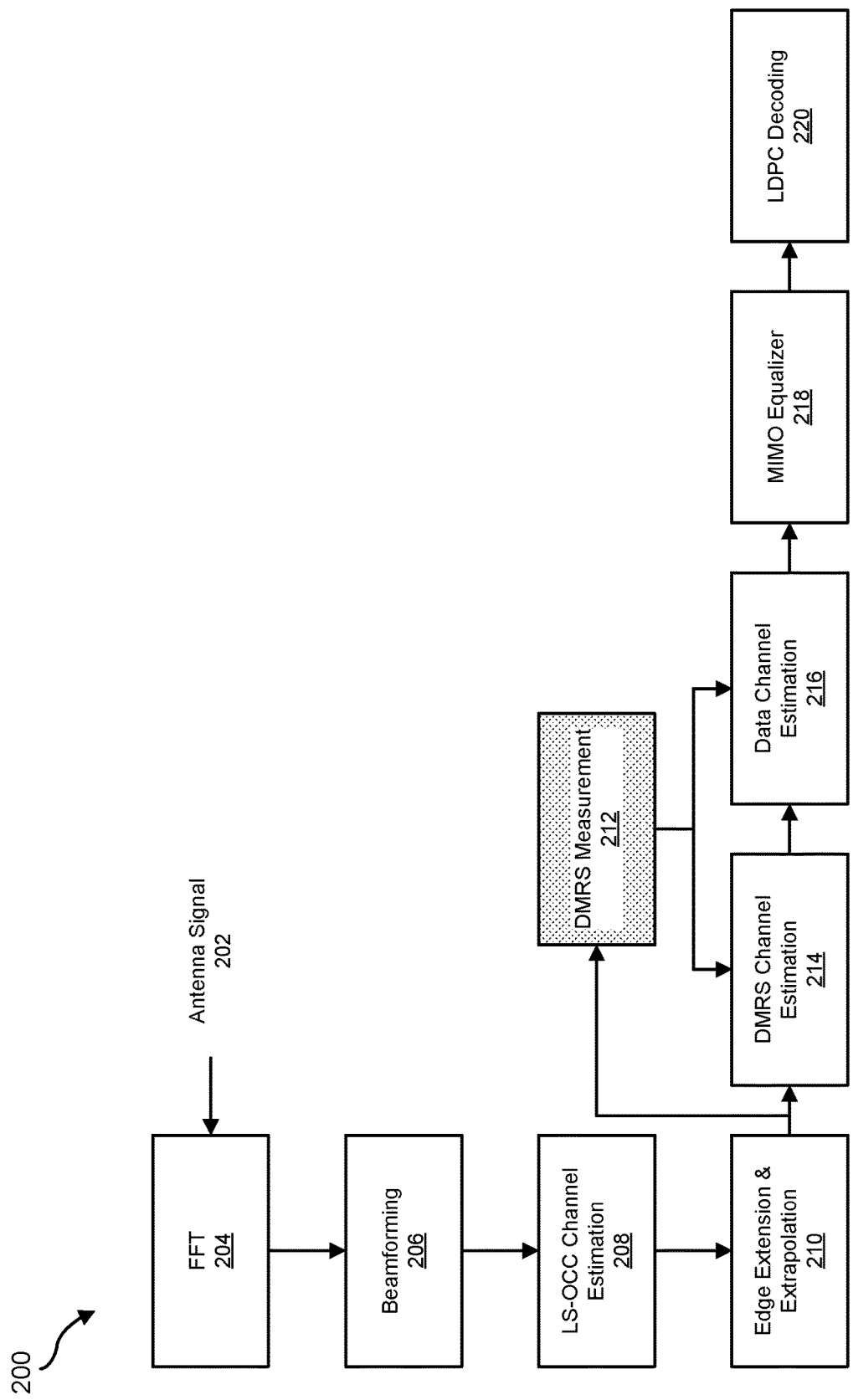
FIG. 2 shows a flow diagram for an example MIMO processing chain.

FIG. 2 shows a flow diagram for an example MIMO processing chain 200. As shown, the example massive MIMO processing chain 200 may include operations of receiving of an antenna signal 202, a fast Fourier transform (FFT) operation 204, a beamforming operation 206, an LS OCC channel estimation operation 208, a channel estimation signal edge extension and edge extension and extrapolation operation 210, a DMRS measurement operation 212, a DMRS channel estimation operation 214, a data channel estimation operation 216, a MIMO equalizer operation 218, and a low-density parity check code (LDPC) decoding operation 220. In general, the systems and methods disclosed herein may relate to DMRS measurement operation 212.

In some examples, FFT operation 204 may include cyclic prefix removal and FFT that converts the received time domain signal to a frequency domain signal. In at least one embodiment, beamforming operation 210 may include an antenna-to-beam transformation and beam selection, which may reduce interference from one or more adjacent cells that may have different spatial characteristics and may reduce the signal dimension to reduce processing complexity and data traffic.

In some examples, LS-OCC channel estimation operation 208 may be used to obtain a raw channel estimation for each pair of ports and antennas or beams. Furthermore, in some examples, edge extension and edge extension and extrapolation operation 210 may include any suitable system, method, or technique that may be used to extend and/or to extrapolate one or more edges of a channel estimation signal. U.S. Provisional Patent Application U.S. Provisional Patent Application No. 63/331,484, filed on Apr. 15, 2022 and incorporated herein by reference above may disclose and/or describe one or more systems and/or methods for extending and/or extrapolating one or more edges of a channel estimation signal. One or more of those systems, methods, and/or techniques may be included as part of and/or incorporated within edge extension and extrapolation operation 210.

In some examples, DMRS measurement operation 212 may be used to provide measurements that may be needed for the DMRS channel estimation and data channel estimation. This may include a signal-to-noise ratio measurement before a MIMO equalizer operation (e.g., MIMO equalizer operation 218) as well as measurements regarding a power delay profile. In some examples, a power delay profile (PDP) may give an intensity of the signal received through a multipath channel as a function of time delay. The time delay may be a difference in travel time between multipath arrivals.

DMRS channel estimation operation 214 may be used to reduce noise in the raw channel estimation and to interpolate the noise-reduced channel estimation to all resource elements on the DMRS resource elements. Furthermore, data channel estimation operation 216 may be used to propagate the DMRS channel estimation to all data resource elements.

As further shown in FIG. 2, MIMO equalizer operation 218 may be used to remove a channel effect on a received signal over data resource elements and to separate ports to achieve and/or identify soft symbols for each port. LDPC decoding operation 220 may be used to decode soft symbols for each user equipment to produce data bits for each user equipment.

This disclosure is generally directed to systems and methods for improving channel estimation for 5G-NR PUSCH. As described in greater detail below, this disclosure describes new techniques for DMRS measurements that may be needed for DMRS channel estimation and data channel estimation. This may include a signal-to-interference-plus-noise ratio (SINR) measurement prior to a MIMO equalizer operation and/or a PDP measurement operation.

The present application is directed to systems and methods for improving DMRS channel estimation in 5G-NR PUSCH communications. As will be described in greater detail below, embodiments of one or more of the systems described herein may receive a channel estimation signal that may a plurality of frequency domain signals. Each frequency domain signal may correspond to an antenna in a plurality of antennas, a port in a plurality of ports, and a DMRS sequence. For each frequency domain signal, one or more embodiments may convert the frequency domain signal to a time domain signal and may determine a power level of the time domain signal. Embodiments may further determine, for each port in the plurality of ports, a sum of the power levels of the time domain signals corresponding to the port, each antenna in the plurality of antennas, and the DMRS sequence, and may measure, based on the determined sum corresponding to the port, a pre-equalization SINR and a PDP.

The following will provide, with reference to FIGS. 1-4 and 6-8, detailed descriptions of systems for improving channel estimation. Detailed descriptions of corresponding computer-implemented methods will also be provided in connection with FIG. 5.

Figure 3:
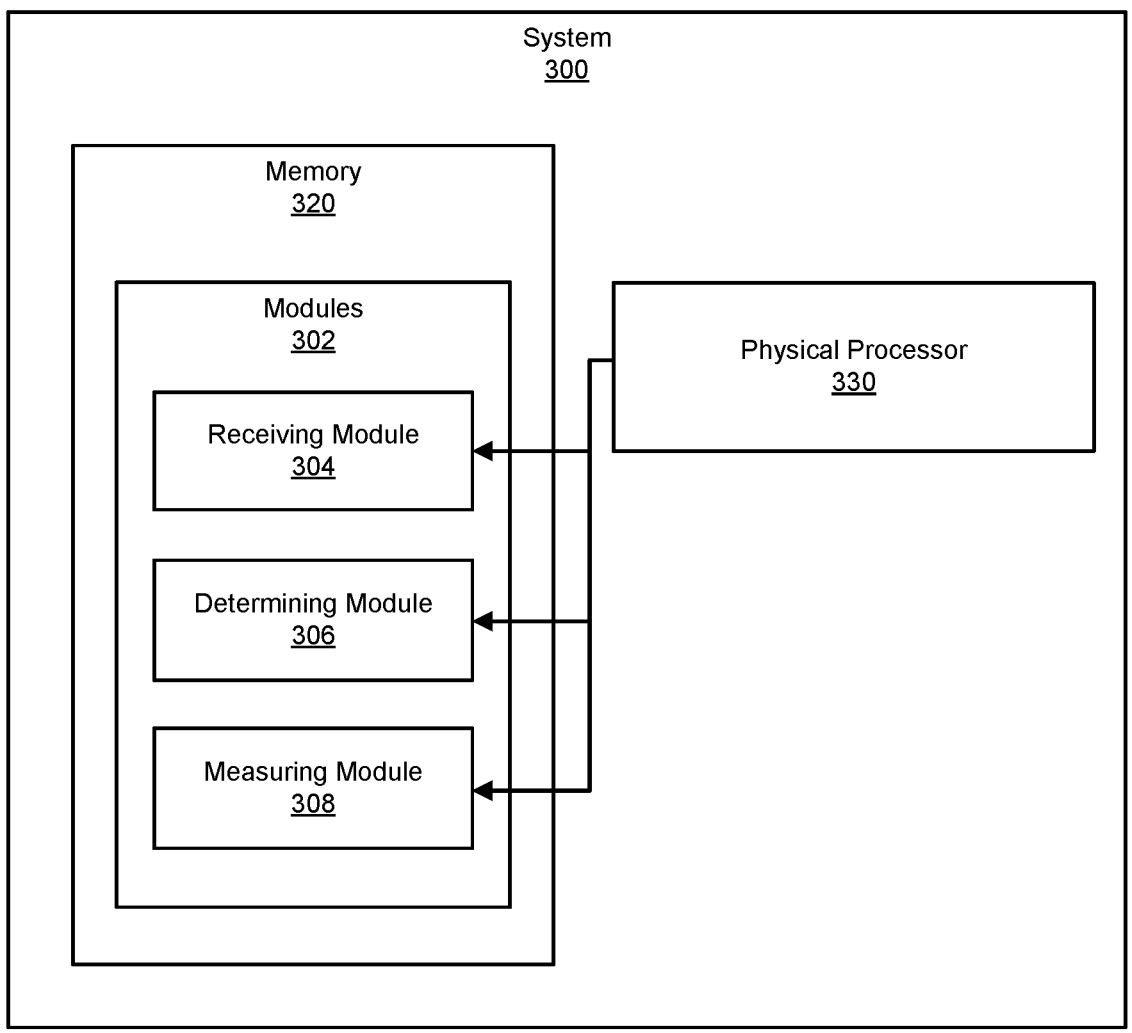
FIG. 3 is a block diagram of an example system for improving channel estimation.

FIG. 3 is a block diagram of an example system 300 for improving channel estimation. As illustrated in this figure, example system 300 may include one or more modules 302 for performing one or more tasks. As will be explained in greater detail below, modules 302 may include a receiving module 304 that receives a channel estimation signal comprising a plurality of frequency domain signals, each frequency domain signal corresponding to an antenna in a plurality of antennas, a port in a plurality of ports, and a DMRS sequence.

Example system 300 may also include a determining module 306 that (1) for each frequency domain signal, (A) converts the frequency domain signal to a time domain signal, and (B) determines a power level of the time domain signal, and (2) determines, for each port in the plurality of ports, a sum of the power levels of the time domain signals corresponding to the port, each antenna in the plurality of antennas, and the DMRS sequence. As further illustrated in FIG. 3, example system 300 may also include a measuring module 308 that measures, for each port in the plurality of ports, based on the determined sum corresponding to the port, (A) a pre-equalization SINR, and (B) a PDP.

As also illustrated in FIG. 3, example system 300 may also include one or more memory devices, such as memory 320. Memory 320 generally represents any type or form of volatile or non-volatile storage device or medium capable of storing data and/or computer-readable instructions. In one example, memory 320 may store, load, and/or maintain one or more of modules 302. Examples of memory 320 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As further illustrated in FIG. 3, example system 300 may also include one or more physical processors, such as physical processor 330. Physical processor 330 generally represents any type or form of hardware-implemented processing unit capable of interpreting and/or executing computer-readable instructions. In one example, physical processor 330 may access and/or modify one or more of modules 302 stored in memory 320. Additionally or alternatively, physical processor 330 may execute one or more of modules 302 to facilitate improving of channel estimation. Examples of physical processor 330 include, without limitation, microprocessors, microcontrollers, central processing units (CPUs), Field-Programmable Gate Arrays (FPGAs) that implement softcore processors, Application-Specific Integrated Circuits (ASICs), digital signal processors (DSPs), portions of one or more of the same, variations or combinations of one or more of the same, or any other suitable physical processor.

Figure 4:
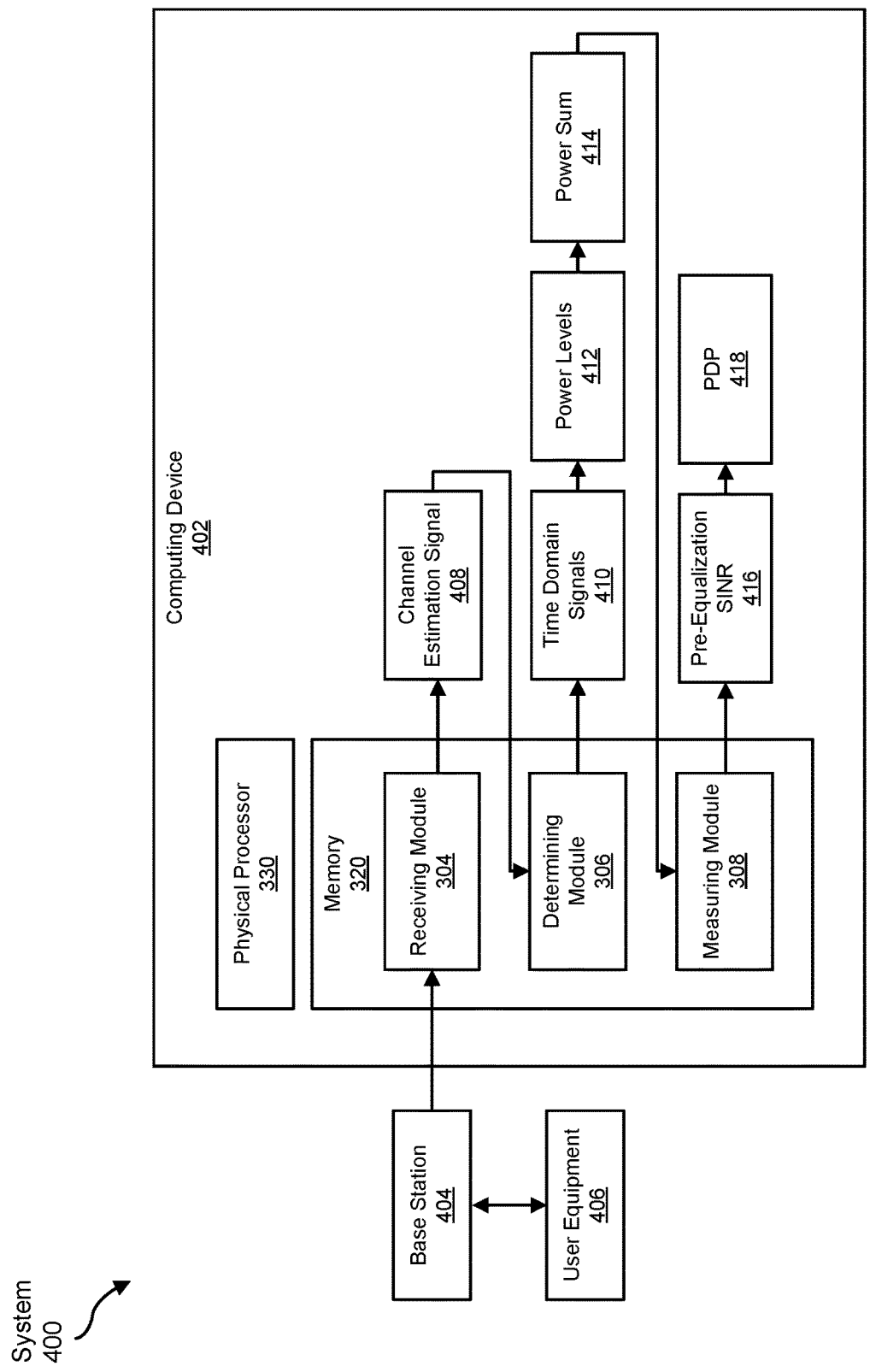
FIG. 4 is a block diagram of an example implementation of a system for improving channel estimation.

Example system 300 in FIG. 3 may be implemented in a variety of ways. For example, all or a portion of example system 300 may represent portions of an example system 400 ("system 400") in FIG. 4. As shown in FIG. 4, system 400 may include computing device 402 in communication with a base station 404. Base station 404 may further be in communication with a user equipment 406. In at least one example, computing device 402 may be programmed with one or more of modules 302.

In at least one embodiment, one or more of modules 302 from FIG. 3 may, when executed by computing device 402, enable computing device 402 to perform one or more operations to improve channel estimation. For example, as will be described in greater detail below, receiving module 304 may cause computing device 402 to receive a channel estimation signal (e.g., channel estimation signal 408) that includes a plurality of frequency domain signals, each frequency domain signal corresponding to an antenna in a plurality of antennas, a port in a plurality of ports, and a DMRS sequence.

Additionally, determining module 306 may cause computing device 402 to, (1) for each frequency domain signal, (A) convert the frequency domain signal to a time domain signal (e.g., one of time domain signals 410), and (B) determine a power level of the time domain signal (e.g., one of power levels 412), and (2) determine, for each port in the plurality of ports, a sum of the power levels of the time domain signals corresponding to the port, each antenna in the plurality of antennas, and the DMRS sequence (e.g., power sum 414). Furthermore, measuring module 308 may cause computing device 402 to measure, for each port in the plurality of ports, based on the determined sum corresponding to the port, (A) a pre-equalization SINR (e.g., pre-equalization SINR 416), and (B) a PDP (e.g., PDP 418). Computing device 402 generally represents any type or form of computing device capable of reading and/or executing computer-executable instructions and/or hosting executables. Examples of computing device 402 include, without limitation, application servers, storage servers, database servers, web servers, signal processing devices, and/or any other suitable computing device configured to run certain software applications and/or provide various application, storage, and/or signal processing services.

In at least one example, computing device 402 may be a computing device programmed with one or more of modules 302. All or a portion of the functionality of modules 302 may be performed by computing device 402 and/or any other suitable computing system. As will be described in greater detail below, one or more of modules 302 from FIG. 3 may, when executed by at least one processor of computing device 402, enable computing device 402 to improve channel estimation by reducing edge effects for one or more signals used for a DMRS channel estimation process.

Base station 404 may generally represent an element within a wireless communication system (e.g., system 400) that provides radio coverage and connectivity to user equipment (e.g., user equipment 406) within a specific area or cell. A 5G base station may also be referred to as a gNodeB (gNB). Base station 404 may include a variety of components including, without limitation, an antenna array, a transceiver unit, and one or more baseband processing units. The antenna array may be used to transmit and receive radio signals, while the transceiver unit may be responsible for processing the signals and converting them to digital data that can be sent to the baseband processing units. The baseband processing units may be responsible for performing signal processing, error correction, and modulation and demodulation of the signals. Although not so illustrated in FIG. 4, in some examples, computing device 402 may be included as part of base station 404 and/or may be in communication with one or more components of base station 404.

User equipment 406 may include any mobile device or endpoint that connects to a 5G network to access various services, such as voice, video, and data communication. user equipment 406 can be a smartphone, tablet, laptop, or any other wireless device that is designed to operate with 5G networks. In some examples, user equipment 406 may include a 5G modem, one or more antennas, and/or any other suitable hardware that may facilitate communication with base station 404.

Many other devices or subsystems may be connected to system 300 in FIG. 3 and/or system 400 in FIG. 4. Conversely, all of the components and devices illustrated in FIGS. 3 and 4 need not be present to practice the embodiments described and/or illustrated herein. The devices and subsystems referenced above may also be interconnected in different ways from those shown in FIG. 4. Systems 300 and 400 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

Figure 5:
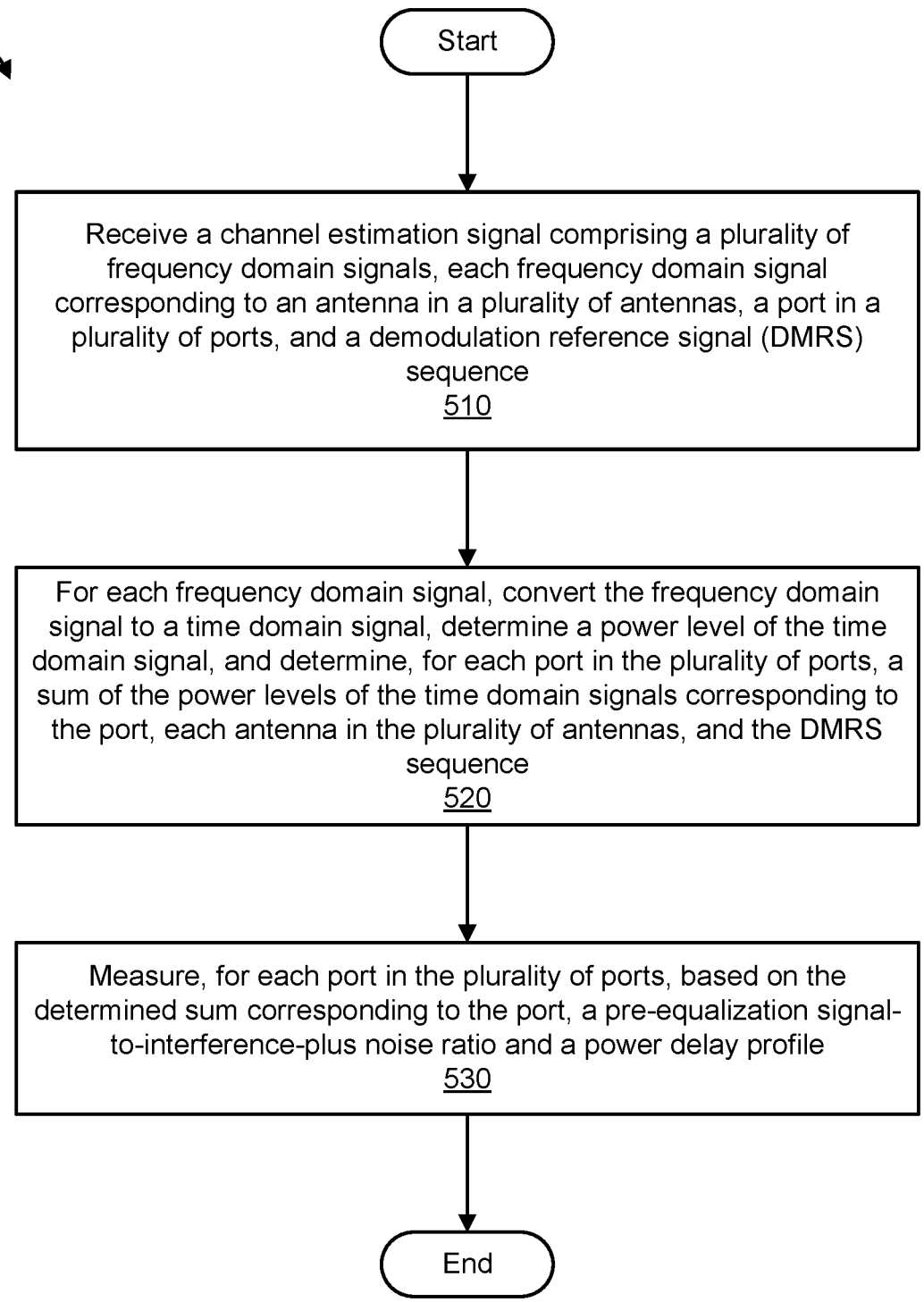
FIG. 5 is a flow diagram of an example method for improving channel estimation.

FIG. 5 is a flow diagram of an example computer-implemented method 500 for allocating shared resources in multi-tenant environments. The steps shown in FIG. 5 may be performed by any suitable computer-executable code and/or computing system, including system 300 in FIG. 3, system 400 in FIG. 4, and/or variations or combinations of one or more of the same. In one example, each of the steps shown in FIG. 5 may represent an algorithm whose structure includes and/or is represented by multiple sub-steps, examples of which will be provided in greater detail below.

As illustrated in FIG. 5, at step 510, one or more of the systems described herein may receive a channel estimation signal that may include a plurality of frequency domain signals, each frequency domain signal corresponding to an antenna in a plurality of antennas, a port in a plurality of ports, and a demodulation reference signal (DMRS) sequence. For example, receiving module 304 may, as part of computing device 402, cause computing device 402 to receive channel estimation signal 408.

Receiving module 304 may cause computing device 402 to receive channel estimation signal 408 in a variety of contexts. For example, user equipment 406 may seek to establish an uplink with base station 404. User equipment 406 may send a DMRS to base station 404 as part of the uplink transmission. As mentioned above, the DMRS contains a specific pattern of bits that may allow base station 404 to identify and extract the signal from the received waveform. The DMRS may help to mitigate the effects of interference and noise in the wireless channel and improve the reliability and performance of the communication system.

As mentioned above in reference to FIG. 2, a base station (e.g., base station 404) may perform one or more processes on a received antenna signal (e.g., antenna signal 202) prior to a DMRS channel estimation operation (e.g., DMRS channel estimation operation 214). For example, as shown in FIG. 2, a base station may perform an FFT operation (e.g., FFT operation 204), a beamforming operation (e.g., beamforming operation 206), and an LS OCC channel estimation operation (e.g., LS OCC channel estimation operation 208) prior to passing a frequency domain channel estimation signal that includes a plurality of DMRS samples (e.g., channel estimation signal 408) as input to a DMRS channel estimation operation (e.g., DMRS channel estimation operation 214). LS OCC channel estimation operation 208 is to obtain a raw channel estimation signal for each pair of port(s) and antenna(s). Once LS OCC channel estimation operation 208 obtains the raw channel estimation signal, the raw channel estimation signal is passed to the DMRS channel estimation operation 214 to further process the raw channel estimation signal to improve the accuracy and reliability of data demodulation in the uplink transmission.

Hence, receiving module 304 may cause computing device 402 to receive channel estimation signal 408 from one or more components of base station 404.

Returning to FIG. 5, at step 520, one or more of the systems described herein may, (A) for each frequency domain signal, (i) convert the frequency domain signal to a time domain signal, and (ii) determine a power level of the time domain signal. For example, determining module 306 may, as part of computing device 402, for each frequency domain signal included in channel estimation signal 408, convert the frequency domain signal to one of time domain signals 410, and determine a corresponding power level in power levels 412. Furthermore, determining module 306 may also determine, for each port in the plurality of ports, a sum of the power levels of the time domain signals corresponding to the port, each antenna in the plurality of antennas, and the DMRS sequence.

Figure 6:
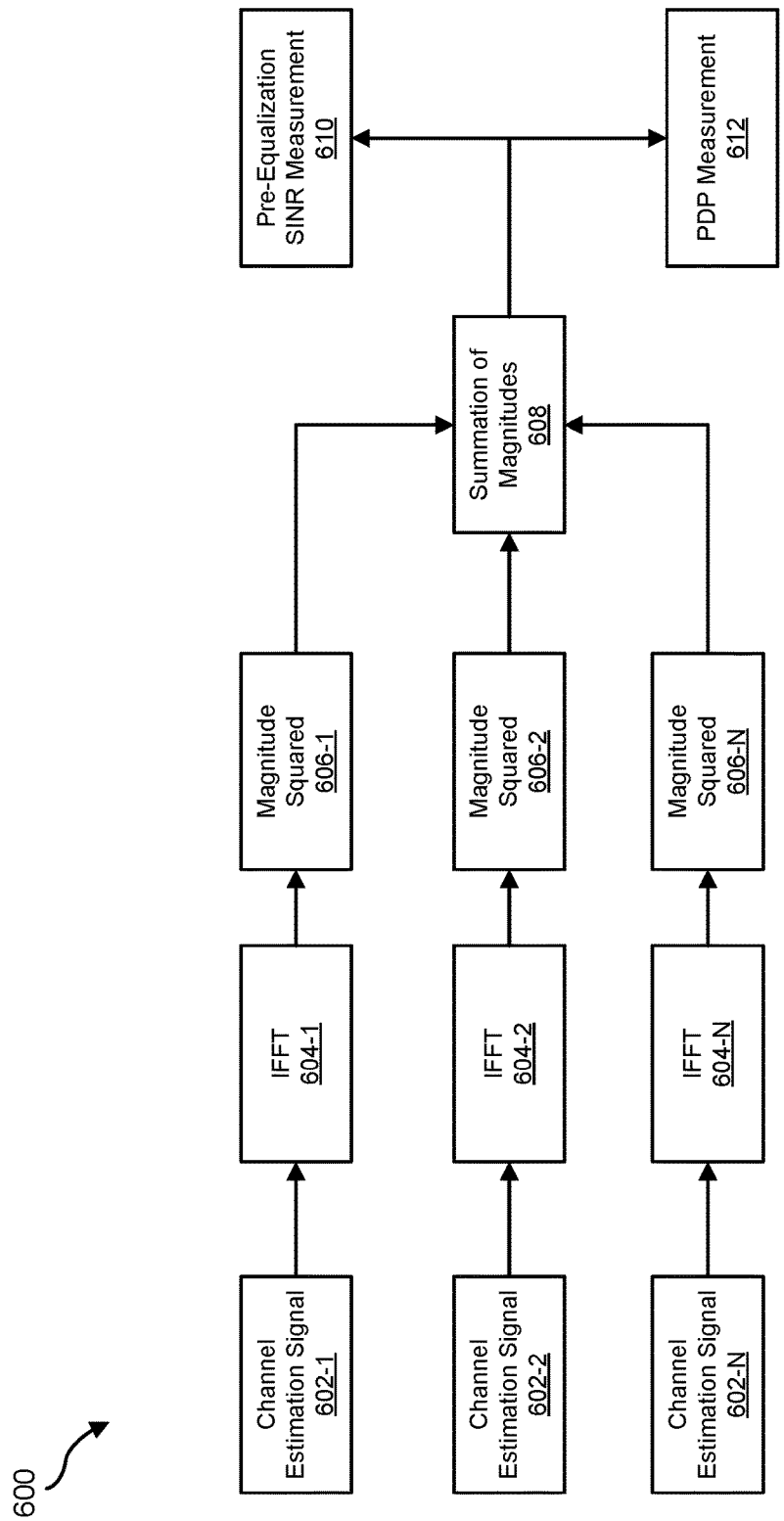
FIG. 6 is a flow diagram that illustrates an example architecture for improving channel estimation in accordance with some embodiments described herein.
Figure 7:
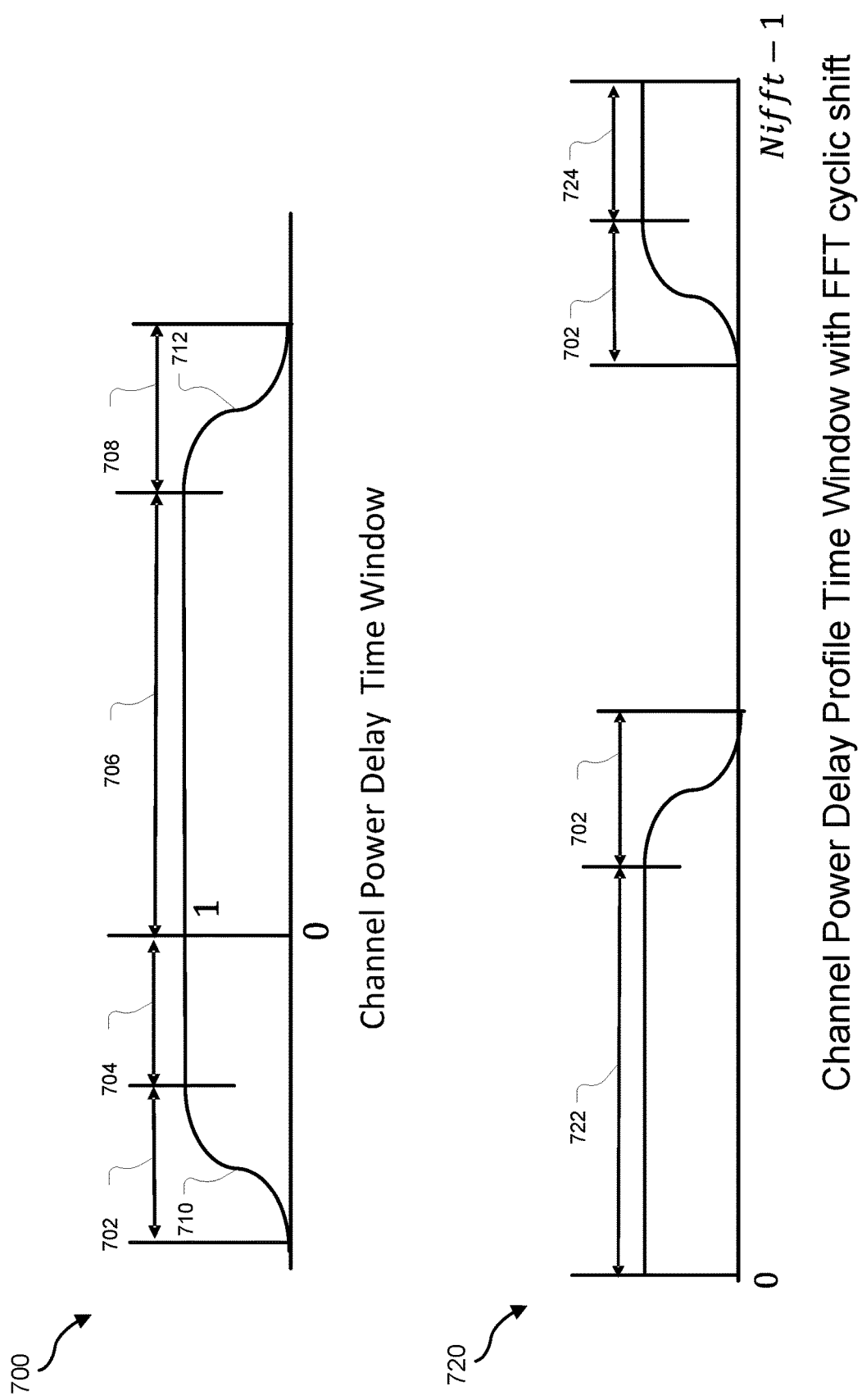
FIG. 7 includes diagrams that illustrate channel power delay time windows.

FIG. 6 includes a flow diagram 600 that may illustrate an overall architecture of DMRS measurements for channel estimation as described herein. As shown in this illustration, at a high level, embodiments of the systems and methods disclosed herein may implement DMRS measurements for channel estimation that may be made for each port independently of measurements of other ports. The LS channel estimations associated with a port, including those at multiple positions, are first processed for edge extension and edge extrapolation. These edge-extended and edge-extrapolated LS channel estimations (e.g., channel estimation signals 602) are each converted to the time domain by an inverse FFT operation (e.g., a respective IFFT 604). These time domain LS channel estimations are then converted to magnitude squared (e.g., a respective magnitude squared 606). These magnitude-squared LS channel estimations are summed into a summation of magnitudes 608. As will be described in greater detail below, this may be followed by a pre-equalizer SINR measurement process 610 and a power delay profile measurement process 612. In this and later examples described herein example, let H(k,nRxAnt, kAddDMRS,nPort) be the LS-OCC channel with edge extension and edge extrapolation, where k is the RE index, nRxAnt is the receiver antenna index, and nPort is the port index. FIG. 7 includes a diagram 700 that illustrates an example of a channel power delay time window with a soft edge width 702, a left edge end 704, a right edge start 706, a soft edge width 708, and cosine edge 710 and cosine edge 712. FIG. 7 also includes a diagram 720 with a channel power delay profile time window with FFT cyclic shift. This further includes a right edge end 722 and a left edge start 724. These will be described in greater detail below.

Returning to FIG. 5, at step 530, one or more of the systems described herein may measure, for each port in the plurality of ports, based on the determined sum corresponding to the port, a pre-equalization signal-to-interference-plus noise ratio and a power delay profile. For example, measuring module 308 may, as part of computing device 402, measure, for each port in the plurality of ports, based on sum of power sum 414, SINR 416 and PDP 418.

In some examples, the pre-equalizer SINR may be a ratio of signal power to the combined noise and interference power in the signal of the LS channel estimation in the frequency domain on each RE. In some examples, one or more of the systems described herein may measure one pre-equalizer SINR per antenna port, per RB segment, with the segment size (i.e., a number of contiguous RBs) as a parameter. The measurements for different antenna ports are independent, even though the ports belong to one UE.

In embodiments of the systems and methods described in this disclosure, the pre-equalizer SINR may be measured in the time domain. As described above, channel estimation signal 408 (with edge extension and extrapolation) may be in the frequency domain. As a starting point, let $H_{LS}(k, kRxAnta, kAddDMRS, kPort)$ be the LS channel estimation, where k is the RE index and kRxAnt is the antenna (or beam for a massive MIMO) index.

In some examples, one or more of modules 302 may choose Nifft as the size of iFFT that converts the LS channel estimation $H_{LS}$ (k,kRxAnta,kPort) to the time domain in accordance with:

$$Nifft = \begin{cases} 128, & \text{if } nRE \leq 128 \\ 256, & \text{if } 128 < nRE \leq 256 \\ 512, & \text{if } 256 < nRE \leq 512 \\ 768, & \text{if } 512 < nRE \leq 768 \\ 1024, & \text{if } 768 < nRE \leq 1024 \end{cases},$$

where nRE is the number of samples after the edge extension and extrapolation.

In some examples, one or more of modules 302 may further include 0-padded to Nifft and applying of the size of the Nifft to the sequences of the LS channel with edge extension and extrapolation for each antenna and each port such that:

$h(l,kRxAnt,kAddDMRS,kPort)=\text{iFFT}(H_{LS}(k,kRxAnt,kPort))$ where iFFT is performed along the index k and H (k, kRxAnt, kPort) is 0-padded to Nifft if the LS channel with edge extension and extrapolation has a size less than Nifft.

Additionally, one or more of modules 302 may calculate a magnitude squared of h(l,kRxAnt,kAddDMRS,kPort) over kRxAnt and kAddDMRS for each port:

$H(l,kRxAnt,kAddDMRS,kPort)=h(l,kRxAnt,kAddDMRS,kPort).*\text{conj}(h(l,kRxAnt,kAddDMRS,kPort))$ In some examples, one or more of modules 302 may further sum the magnitude squared of H(l,kRxAnt, kAddDMRS,kPort) over kRxAnt and kAddDMRS for each port:

$$H(l, kPort) = \sum_{kRxAnt, kAddDMRS} H(l, kRxAnt, kAddDMRS, kPort)$$

Figure 8:
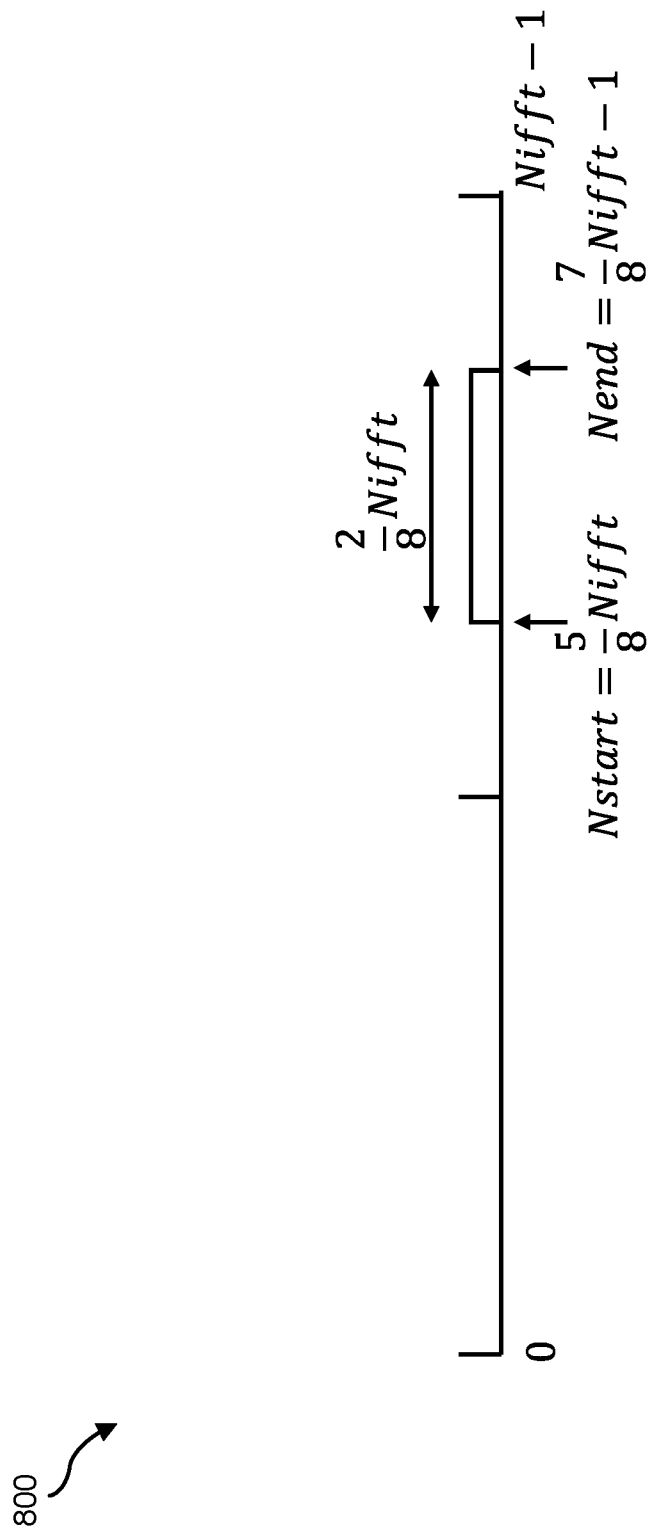
FIG. 8 includes a diagram that illustrates selecting of a noise window in accordance with some embodiments described herein.

FIG. 8 includes a diagram 800 that illustrates selecting of a noise window. As shown, in some examples, one or more of modules 302 may choose a noise window [Nstart~Nend] in which the signal energy is negligible. An example may include $$\frac{5}{8}Nifft \sim \frac{7}{8},$$

with a window length LN in accordance with $$LN = \frac{1}{4}Nifft.$$

FIG. A10 further includes a graphical illustration of this example.

In some embodiments, one or more of modules 302 may calculate a total energy ET and noise energy EN in the noise window such that:

$$ET(kPort) = \sum_{l=0Nifft-1} H(l, kPort)$$

and $$EN(kPort) = \sum_{l=NoiseWindow} H(l, kPort)$$

In some examples, the noise energy history may carry over. For example, one or more embodiments may smooth over history slots for noise energy, where n is the current slot index, n−1 is the prior slot index:

$EN(kPort,n)=(1-\alpha)EN(kPort,n)+\alpha EN(kPort),$ where 0≤α≤1 is a parameter. In some examples, α=0.9.

Note that in some embodiments there may be no need for smoothing over history for total energy. Thus:

$ET(kPort,n)=ET(kPort).$

One or more embodiments may further calculate the pre-equalizer SINR, such that:

$$preEqSinr(kPort, n) = \frac{ET(kPort, n)L_N - EN(kPort, n)Nifft}{EN(kPort, n)Nifft}.$$

Additionally or alternatively, the pre-equalizer SINR may be calculated in dB, where n is dropped for notation convenience:

$preEqSinr_{dB}(kPort)=10*\log 10(preEqSinr(kPort))$

In some embodiments, one or more of modules 302 (e.g., measuring module 308) may implement and/or execute a PDP measurement operation (e.g., power delay profile measurement process 612). In some examples, measuring module 308 may search the peak of H(l,kPort) along l, resulting in the peak value Hpeak(kPort) and index Ipeak(kPort):

$[Hpeak(kPort),Ipeak(kPort)]=\max\{H(l,kPort)\}$

In some examples, measuring module 308 may validate the peak index Ipeak(kPort) in accordance with:

$$Ipeak(kPort) = \begin{cases} -(Nifft - Ipeak(kPort)), & \text{if } Ipeak(kPort) > \frac{3}{4}Nifft \\ 10, & \text{if } Ipeak(kPort) > \frac{1}{2}Nifft \\ Ipeak(kPort), & \text{otherwise} \end{cases}$$

It may be noted that (1) when $$Ipeak(kPort) > \frac{3}{4}Nifft,$$

it may mean that the peak is on the negative side or an early arrival, and (2) when $$iPeak(kPort) > \frac{1}{2}Nifft,$$

it may mean that the signal quality is too low, the measured peak is not reliable to use, and thus the system should guess a value for Ipeak(kPort).

In some examples, one or more of modules 302 (e.g., measuring module 308) may calculate and/or estimate a noise floor, with noise energy EN and noise window length LN:

noiseFloor=$EN/LN$

In some examples, one or more of the systems described herein (e.g., measuring module 308) may perform a left edge decision process, where embodiments may search for Left-EdgeStart (e.g., left edge start 724), searching the index l (starting from kLeftEdgeStart toward Nifft) such that:

$H(l,kPort)>\alpha\times$noise Floor where α>1 is a parameter (e.g., α=3) and kLeftEdge is a parameter (e.g.m $$kLeftEdge = \frac{5}{8}Nifft$$

In some examples, one or more of modules 302 (e.g., measuring module 308) may execute a right edge decision process. As part of a right-edge decision process, embodiments may search for rightEdgeEnd(kPort), searching the index l (starting from kRightEdgeEnd toward 0) such that:

$H(l,kPort)>\max\{\beta(Hpeak(kPort)-noiseFloor)\}$ where β is a parameter (e.g., 3%) and kRightEdgeEnd is a parameter (e.g., $$\frac{5}{8}Nifft,$$

Continuing, some embodiments may further calculate a peak to a right edge in accordance with:

peak2RightEdge(kPort)=rightEdge(kPort)−Ipeak(kPort)

In some examples, a right edge decision process may further include a rightEdgeExtra decision process, where embodiments may calculate rightEdgeExtra with measured preEqSinr$_{dB}$ (kport), which is the measured preEqSinr(kPort) in dB:

$$rightEdgeExtra = \begin{cases} 0.5, & \text{if } preEqSinr_{dB}(kPort) < 4 \\ 2.25, & \text{if } preEqSinr_{dB}(kPort) > 20 \\ 0.5 + 1.75\sin\left(0.5\pi \times \frac{preEqSinr_{dB}(kPort) - 4}{15}\right), \end{cases}$$

otherwise.

In some examples, embodiments may further calculate the modified rightEdgeEnd:

rightEdgeEnd(kPort)=rightEdgeEnd(kPort)+rightEdgeEextra×peak2RightEdge(kPort)

Moreover, in some examples, one or more of modules 302 may finalize the modified rightEdge:

$$rightEdgeExtra(kPort) = \begin{cases} \frac{3}{4}Nifft, & \text{if } rightEdge(kPort) > \frac{3}{4}Nifft \\ rightEdgeEnd(kPort), & \text{otherwise.} \end{cases}$$

Continuing with the PDP process, one or more embodiments may calculate, identify, and/or determine a SofEdgeWidth such that:

$$SofEdgeWidth = \lceil \gamma \times Nifft \rceil$$

where $$\gamma = \begin{cases} 0.01, & \text{if } preEqSinr_{dB} \leq 0 \\ 0.02, & \text{if } 0 < preEqSinr_{dB} \leq 10 \\ 0.04, & \text{if } 10 < preEqSinr_{dB} \leq 20 \\ 0.06, & \text{if } preEqSinr_{dB} > 20 \end{cases}.$$

As may be apparent by the foregoing, the systems and methods disclosed herein may have many benefits over conventional options for DMRS measurements. As described above, the systems and methods described herein may include an innovative DMRS measurement architecture with a series of techniques that may improve DMRS measurements. In some examples, embodiments may make a DMRS measurement after converting the LS-OCC channel estimation to the time domain. Embodiments may further make one set of measurements per antenna port and may sum the magnitude squared of all the time-domain LS-OCC channel estimations associated with each port. Additional examples and/or embodiments may further include and/or implement innovative techniques for pre-equalizer SINR measurement, power delay profile measurement, and/or windowing parameters that may further improve DMRS measurements.

The following example embodiments are also included in this disclosure:

Example 1: A computer-implemented method comprising (1) receiving a channel estimation signal comprising a plurality of frequency domain signals, each frequency domain signal corresponding to an antenna in a plurality of antennas, a port in a plurality of ports, and a demodulation reference signal (DMRS) sequence, (2) for each frequency domain signal, (A) converting the frequency domain signal to a time domain signal, and (B) determining a power level of the time domain signal, (3) determining, for each port in the plurality of ports (a) a sum of the power levels of the time domain signals corresponding to the port, each antenna in the plurality of antennas, and the DMRS sequence, and (b) based on the determined sum corresponding to the port, measuring (i) a pre-equalization signal-to-interference-plus noise ratio (SINR), and (ii) a power delay profile (PDP).

Example 2: The computer-implemented method of example 1, wherein measuring the pre-equalization SINR comprises selecting, for each time domain signal, based on a signal energy in a portion of the time domain signal, a noise window for a noise energy calculation.

Example 3: The computer-implemented method of example 2, wherein measuring the pre-equalization SINR further comprises, for each port in the plurality of ports, determining (1) a total energy of the time domain signals that correspond to the port, and (2) based on the determined noise window, a total noise energy of the time domain signals that correspond to the port.

Example 4: The computer-implemented method of example 3, wherein measuring the pre-equalization SINR further comprises adjusting, for each port in the plurality of ports, the total noise energy of the time domain signals that correspond to the port based on a previously determined total noise energy of prior time domain signals that previously corresponded to the port.

Example 5: The computer-implemented method of example 4, wherein measuring the pre-equalization SINR further comprises, for each port in the plurality of ports, determining the pre-equalization SINR based on the adjusted total noise energy corresponding to the port and the total energy of the time domain signals that correspond to the port.

Example 6: The computer-implemented method of any of examples 3-4, wherein measuring the PDP comprises, for each port in the plurality of ports, (1) determining a peak value and a peak index corresponding to the peak, and (2) validate the peak value based on a relationship of the determined peak value and the corresponding time domain signal.

Example 7: The computer-implemented method of example 6, wherein measuring the PDP further comprises, for each port in the plurality of ports, estimating a noise floor based on the total energy of the time domain signals that correspond to the port and a length of the noise window.

Example 8: The computer-implemented method of example 7, wherein measuring the PDP further comprises, for each port in the plurality of ports, identifying a left edge of a PDP time window that corresponds to the port.

Example 9: The computer-implemented method of example 8, wherein measuring the PDP further comprises, for each port in the plurality of ports, identifying a right edge of the PDP time window that corresponds to the port.

Example 10: The computer-implemented method of example 9, wherein identifying the right edge of the PDP time window further comprises adjusting the right edge of the PDP time window based on the SINR corresponding to the port.

Example 11: A system comprising (1) a receiving module, stored in memory, that receives a channel estimation signal comprising a plurality of frequency domain signals, each frequency domain signal corresponding to an antenna in a plurality of antennas, a port in a plurality of ports, and a demodulation reference signal (DMRS) sequence, (2) a determining module, stored in memory, that (A) for each frequency domain signal (i) converts the frequency domain signal to a time domain signal, and (ii) determines a power level of the time domain signal, and (B) determines, for each port in the plurality of ports, a sum of the power levels of the time domain signals corresponding to the port, each antenna in the plurality of antennas, and the DMRS sequence, (3) a measuring module, stored in memory, that measures, for each port in the plurality of ports, based on the determined sum corresponding to the port (A) a pre-equalization signal-to-interference-plus noise ratio (SINR), and (B) a power delay profile measurement, and (4) at least one physical processor that executes the receiving module, the determining module, and the measuring module.

Example 12: The system of example 11, wherein the measuring module measures the pre-equalization SINR by selecting, for each time domain signal, based on a signal energy in a portion of the time domain signal, a noise window for a noise energy calculation.

Example 13: The system of example 12, wherein the measuring module further measures the pre-equalization SINR by, for each port in the plurality of ports, determining (1) a total energy of the time domain signals that correspond to the port, and (2) based on the determined noise window, a total noise energy of the time domain signals that correspond to the port.

Example 14: The system of example 13, wherein the measuring module further measures the pre-equalization SINR by adjusting, for each port in the plurality of ports, the total noise energy of the time domain signals that correspond to the port based on a previously determined total noise energy of prior time domain signals that previously corresponded to the port.

Example 15: The system of example 14, wherein the measuring module further measures the SINR by, for each port in the plurality of ports, measuring the SINR based on the adjusted total noise energy corresponding to the port and the total energy of the time domain signals that correspond to the port.

Example 16: The system of any of examples 13-14, wherein the measuring module measures the PDP by, for each port in the plurality of ports, (1) determining a peak value and a peak index corresponding to the peak, and (2) validate the peak value based on a relationship of the determined peak value and the corresponding time domain signal.

Example 17: The system of example 16, wherein the measuring module further measures the PDP by, for each port in the plurality of ports, estimating a noise floor based on the total energy of the time domain signals that correspond to the port and a length of the noise window.

Example 18: The system of example 17, wherein the measuring module further measures the PDP by, for each port in the plurality of ports, identifying (1) a left edge of a PDP time window that corresponds to the port, and (2) a right edge of the PDP time window that corresponds to the port.

Example 19: A system comprising (1) a fifth-generation new radio (5G NR) base station that (A) receives an uplink signal from a user equipment device, (B) generates, based on the uplink signal, a channel estimation signal comprising a plurality of frequency domain signals, each frequency domain signal corresponding to an antenna in a plurality of antennas, a port in a plurality of ports, and a demodulation reference signal (DMRS) sequence, (2) a DMRS channel estimation device comprising (A) a receiving module that receives the channel estimation signal, (B) a determining module that (i) for each frequency domain signal (a) converts the frequency domain signal to a time domain signal, and (b) determines a power level of the time domain signal, and (ii) determines, for each port in the plurality of ports, a sum of the power levels of the time domain signals corresponding to the port, each antenna in the plurality of antennas, and the DMRS sequence, (C) a measuring module that measures, for each port in the plurality of ports, based on the determined sum corresponding to the port (i) a pre-equalization signal-to-interference-plus noise ratio (SINR), and (ii) a power delay profile measurement.

Example 20: The system of example 19, wherein the measuring module measures the pre-equalization SINR by (1) selecting, for each time domain signal, based on a signal energy in a portion of the time domain signal, a noise window for a noise energy calculation, and (2) for each port in the plurality of ports, determining (A) a total energy of the time domain signals that correspond to the port, and (B) based on the determined noise window, a total noise energy of the time domain signals that correspond to the port.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive a frequency domain signal to be transformed, transform the frequency domain signal, output a result of the transformation to perform a channel estimation function, use the result of the transformation to estimate an uplink channel, and store the result of the transformation to maintain or reestablish a connection with a user equipment device via the uplink channel. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
receiving a channel estimation signal comprising a plurality of frequency domain signals, each frequency domain signal corresponding to an antenna in a plurality of antennas, a port in a plurality of ports, and a demodulation reference signal (DMRS) sequence;
for each frequency domain signal:
converting the frequency domain signal to a time domain signal; and
determining a power level of the time domain signal;
determining, for each port in the plurality of ports:
a sum of the power levels of the time domain signals corresponding to the port, each antenna in the plurality of antennas, and the DMRS sequence; and
based on the determined sum corresponding to the port, measuring:
a pre-equalization signal-to-interference-plus noise ratio (SINR); and
a power delay profile (PDP).

2. The computer-implemented method of claim 1, wherein measuring the pre-equalization SINR comprises selecting, for each time domain signal, based on a signal energy in a portion of the time domain signal, a noise window for a noise energy calculation.

3. The computer-implemented method of claim 2, wherein measuring the pre-equalization SINR further comprises, for each port in the plurality of ports, determining:
a total energy of the time domain signals that correspond to the port; and
based on the noise window, a total noise energy of the time domain signals that correspond to the port.

4. The computer-implemented method of claim 3, wherein measuring the pre-equalization SINR further comprises adjusting, for each port in the plurality of ports, the total noise energy of the time domain signals that correspond to the port based on a previously determined total noise energy of prior time domain signals that previously corresponded to the port.

5. The computer-implemented method of claim 4, wherein measuring the pre-equalization SINR further comprises, for each port in the plurality of ports, determining the pre-equalization SINR based on the adjusted total noise energy corresponding to the port and the total energy of the time domain signals that correspond to the port.

6. The computer-implemented method of claim 3, wherein measuring the PDP comprises, for each port in the plurality of ports:
determining a peak value and a peak index corresponding to the peak; and
validate the peak value based on a relationship of the determined peak value and the corresponding time domain signal.

7. The computer-implemented method of claim 6, wherein measuring the PDP further comprises, for each port in the plurality of ports, estimating a noise floor based on the total energy of the time domain signals that correspond to the port and a length of the noise window.

8. The computer-implemented method of claim 7, wherein measuring the PDP further comprises, for each port in the plurality of ports, identifying a left edge of a PDP time window that corresponds to the port.

9. The computer-implemented method of claim 8, wherein measuring the PDP further comprises, for each port in the plurality of ports, identifying a right edge of the PDP time window that corresponds to the port.

10. The computer-implemented method of claim 9, wherein identifying the right edge of the PDP time window further comprises adjusting the right edge of the PDP time window based on the SINR corresponding to the port.

11. A system comprising:
a receiving module, stored in memory, that receives a channel estimation signal comprising a plurality of frequency domain signals, each frequency domain signal corresponding to an antenna in a plurality of antennas, a port in a plurality of ports, and a demodulation reference signal (DMRS) sequence;
a determining module, stored in memory, that:
for each frequency domain signal:
converts the frequency domain signal to a time domain signal; and
determines a power level of the time domain signal; and
determines, for each port in the plurality of ports, a sum of the power levels of the time domain signals corresponding to the port, each antenna in the plurality of antennas, and the DMRS sequence;
a measuring module, stored in memory, that measures, for each port in the plurality of ports, based on the determined sum corresponding to the port:
a pre-equalization signal-to-interference-plus noise ratio (SINR); and
a power delay profile (PDP); and
at least one physical processor that executes the receiving module, the determining module, and the measuring module.

12. The system of claim 11, wherein the measuring module measures the pre-equalization SINR by selecting, for each time domain signal, based on a signal energy in a portion of the time domain signal, a noise window for a noise energy calculation.

13. The system of claim 12, wherein the measuring module further measures the pre-equalization SINR by, for each port in the plurality of ports, determining:
a total energy of the time domain signals that correspond to the port; and
based on the noise window, a total noise energy of the time domain signals that correspond to the port.

14. The system of claim 13, wherein the measuring module further measures the pre-equalization SINR by adjusting, for each port in the plurality of ports, the total noise energy of the time domain signals that correspond to the port based on a previously determined total noise energy of prior time domain signals that previously corresponded to the port.

15. The system of claim 14, wherein the measuring module further measures the SINR by, for each port in the plurality of ports, measuring the SINR based on the adjusted total noise energy corresponding to the port and the total energy of the time domain signals that correspond to the port.

16. The system of claim 13, wherein the measuring module measures the PDP by, for each port in the plurality of ports:
   determining a peak value and a peak index corresponding to the peak; and
   validate the peak value based on a relationship of the determined peak value and the corresponding time domain signal.

17. The system of claim 16, wherein the measuring module further measures the PDP by, for each port in the plurality of ports, estimating a noise floor based on the total energy of the time domain signals that correspond to the port and a length of the noise window.

18. The system of claim 17, wherein the measuring module further measures the PDP by, for each port in the plurality of ports, identifying:
   a left edge of a PDP time window that corresponds to the port; and
   a right edge of the PDP time window that corresponds to the port.

19. A system comprising:
   a fifth-generation new radio (5G NR) base station that:
      receives an uplink signal from a user equipment device;
      generates, based on the uplink signal, a channel estimation signal comprising a plurality of frequency domain signals, each frequency domain signal corresponding to an antenna in a plurality of antennas, a port in a plurality of ports, and a demodulation reference signal (DMRS) sequence;
   a DMRS channel estimation device comprising:
      a receiving module that receives the channel estimation signal;
      a determining module that:
      for each frequency domain signal:
         converts the frequency domain signal to a time domain signal; and
         determines a power level of the time domain signal; and
      determines, for each port in the plurality of ports, a sum of the power levels of the time domain signals corresponding to the port, each antenna in the plurality of antennas, and the DMRS sequence;
      a measuring module that measures, for each port in the plurality of ports, based on the determined sum corresponding to the port:
         a pre-equalization signal-to-interference-plus noise ratio (SINR); and
         a power delay profile measurement.

20. The system of claim 19, wherein the measuring module measures the pre-equalization SINR by:
   selecting, for each time domain signal, based on a signal energy in a portion of the time domain signal, a noise window for a noise energy calculation; and
   for each port in the plurality of ports, determining:
      a total energy of the time domain signals that correspond to the port; and
      based on the determined noise window, a total noise energy of the time domain signals that correspond to the port.

* * * * *